US012806709B2

(12) United States Patent
Park et al.

(10) Patent No.: US 12,806,709 B2
(45) Date of Patent: Nov. 24, 2026

(54) ULTRASONIC WELDING DEVICE AND ULTRASONIC WELDING SYSTEM

(71) Applicant: LG ENERGY SOLUTION, LTD., Seoul (KR)

(72) Inventors: Jin-Seo Park, Daejeon (KR); Moo-Young Kim, Daejeon (KR); Kwang-Jung Kim, Daejeon (KR); Jun-Tak Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/992,460

(22) PCT Filed: Aug. 16, 2023

(86) PCT No.: PCT/KR2023/012131
§ 371 (c)(1),
(2) Date: Jan. 8, 2025

(87) PCT Pub. No.: WO2024/039186
PCT Pub. Date: Feb. 22, 2024

(65) Prior Publication Data

US 2026/0008117 A1 Jan. 8, 2026

(30) Foreign Application Priority Data

Aug. 16, 2022 (KR) ........................ 10-2022-0101926

(51) Int. Cl.
*B23K 20/00* (2006.01)
*B23K 20/10* (2006.01)
*B23K 101/36* (2006.01)

(52) U.S. Cl.
CPC ........ *B23K 20/106* (2013.01); *B23K 2101/36* (2018.08)

(58) Field of Classification Search
CPC ........ B23K 20/10–106; B23K 2101/36; B23K 2101/38; H01M 50/536; Y02E 60/10; B29C 65/08
(Continued)

(56) References Cited

U.S. PATENT DOCUMENTS 11,929,265 B2 * 3/2024 Yadani ................ H10P 72/0428
2002/0166617 A1 * 11/2002 Molander ......... A61F 13/15585 156/496
(Continued)

FOREIGN PATENT DOCUMENTS

CN 85106066 A * 9/1986 ....... B29C 66/73921
CN 109317813 A * 2/2019 ............. B23K 20/26
(Continued)

OTHER PUBLICATIONS

International Search Report (PCT/ISA/210) issued in PCT/KR2023/012131, dated Nov. 21, 2023.

*Primary Examiner* — Kiley S Stoner
(74) *Attorney, Agent, or Firm* — Birch, Stewart, Kolasch & Birch, LLP

(57) ABSTRACT

Discussed is an ultrasonic welding device and an ultrasonic welding system configured to prevent softening of an unwanted portion of a surface of a welded object or bending of the welded object. An ultrasonic welding device may include a horn configured to press a first member to ultrasonically weld the first member and a second member. Further, the horn may include a knurling portion having a plurality of protrusions configured to protrude toward the first member to create a concavo-convex shape on the first member, and each of the plurality of protrusions may have a length m in a direction toward the first member. Here, the length m may be greater than or equal to a thickness of the first member.

10 Claims, 7 Drawing Sheets

(58) Field of Classification Search
USPC ..................... 228/110.1, 1.1; 156/73.1–73.6, 156/580.1–580.2
See application file for complete search history.

(56) References Cited

U.S. PATENT DOCUMENTS

| | | | | |
|---|---|---|---|---|
| 2006/0163315 | A1* | 7/2006 | Delsman | B23K 20/106 228/1.1 |
| 2013/0213552 | A1* | 8/2013 | Kelch | B29C 66/81264 156/580.2 |
| 2014/0087245 | A1* | 3/2014 | Lee | H01M 50/55 228/1.1 |
| 2014/0255768 | A1* | 9/2014 | Jang | H01M 50/561 429/211 |
| 2018/0185624 | A1* | 7/2018 | Ueno | B29C 51/428 |
| 2019/0009357 | A1* | 1/2019 | Miyashiro | B23K 20/106 |
| 2021/0129453 | A1* | 5/2021 | Wang | B29C 66/95 |
| 2022/0048129 | A1* | 2/2022 | Böhm | B23K 26/244 |
| 2023/0045159 | A1* | 2/2023 | Sakurai | B23K 20/2336 |
| 2023/0104232 | A1* | 4/2023 | Bae | B23K 20/10 356/634 |
| 2024/0383065 | A1* | 11/2024 | Huang | B23K 20/10 |
| 2025/0054936 | A1* | 2/2025 | Kim | H01M 4/0409 |
| 2025/0367770 | A1* | 12/2025 | Bae | B23K 20/106 |
| 2026/0008117 | A1* | 1/2026 | Park | B23K 20/106 |

FOREIGN PATENT DOCUMENTS

| | | | | | |
|---|---|---|---|---|---|
| CN | 112046010 | A | * | 12/2020 | B29C 65/08 |
| CN | 112222596 | A | * | 1/2021 | B23K 20/106 |
| CN | 113787251 | A | | 12/2021 | |
| CN | 114178670 | A | * | 3/2022 | B23K 20/10 |
| CN | 114393290 | A | * | 4/2022 | B23K 20/26 |
| CN | 216966614 | U | * | 7/2022 | |
| CN | 114902486 | A | * | 8/2022 | H01M 50/538 |
| CN | 219234240 | U | * | 6/2023 | |
| CN | 121058125 | A | * | 12/2025 | H01M 50/536 |
| EP | 1685919 | A1 | * | 8/2006 | B29C 66/8322 |
| JP | S6211660 | B2 | * | 3/1987 | |
| JP | S6477518 | A | * | 3/1989 | |
| JP | H02139223 | A | * | 5/1990 | |
| JP | H05205841 | A | * | 8/1993 | B29C 66/21 |
| JP | 2004-114136 | A | | 4/2004 | |
| JP | 2005-205421 | A | | 8/2005 | |
| JP | 2009010294 | A | * | 1/2009 | H10W 72/0711 |
| JP | 5135694 | B2 | | 2/2013 | |
| JP | 2014-143230 | A | | 8/2014 | |
| JP | 2014529165 | A | * | 10/2014 | H01M 10/0587 |
| JP | WO2013105361 | A1 | * | 5/2015 | H01M 50/536 |
| JP | 5741299 | B2 | | 7/2015 | |
| JP | 2015199095 | A | * | 11/2015 | |
| JP | 2016-52670 | A | | 4/2016 | |
| JP | 5952402 | B2 | * | 7/2016 | H01M 10/0587 |
| JP | 2018-157082 | A | | 10/2018 | |
| JP | 7305367 | B2 | * | 7/2023 | H01M 10/0413 |
| JP | 7524063 | B2 | * | 7/2024 | H01M 50/55 |
| KR | 10-2014-0110353 | A | | 9/2014 | |
| KR | 20140110353 | A | * | 9/2014 | H01M 50/567 |
| KR | 20150038930 | A | * | 4/2015 | H01M 50/543 |
| KR | 10-2016-0010954 | A | | 1/2016 | |
| KR | 10-2022-0033865 | A | | 3/2022 | |
| KR | 10-2022-0107132 | A | | 8/2022 | |
| WO | WO-2018025362 | A1 | * | 2/2018 | B23K 20/106 |
| WO | WO-2018199439 | A1 | * | 11/2018 | H01M 50/147 |

* cited by examiner

ULTRASONIC WELDING DEVICE AND ULTRASONIC WELDING SYSTEM

CROSS REFERENCE TO RELATED APPLICATION

The present application claims priority to Korean Patent Application No. 10-2022-0101926 filed on Aug. 16, 2022, the disclosures of which are incorporated herein by reference.

TECHNICAL FIELD

The present disclosure relates to an ultrasonic welding device. More specifically, it relates to an ultrasonic welding device and an ultrasonic welding system configured to prevent softening of an unwanted portion of the surface of a welded object or bending of the welded object.

BACKGROUND ART

As the demand for portable electronic products such as laptops, video cameras, and mobile phones has rapidly increased and the commercialization of robots, E-bikes, and electric vehicles (EVs) has begun in earnest, research on high-performance secondary batteries capable of repeated charge/discharge has been actively conducted.

Currently commercialized secondary batteries include nickel cadmium batteries, nickel hydride batteries, nickel zinc batteries, lithium secondary batteries, and the like, and among them, lithium secondary batteries are in the spotlight because they have almost no memory effect compared to nickel-based secondary batteries and thus have advantages of free charge/discharge, very low self-discharge rate, and high energy density.

Meanwhile, as types of secondary batteries, cylindrical, prismatic, and pouch-type batteries are known. In the case of a cylindrical battery, an insulating separator is interposed between a positive electrode and a negative electrode and wound to form a jelly roll-shaped electrode assembly, which is inserted into a housing together with an electrolyte to form a battery. And, a strip-shaped electrode tab may be connected to the uncoated portion of each of the positive electrode and the negative electrode, and the electrode tab is coupled to a terminal by welding to electrically connect the electrode assembly and the electrode terminal exposed to the outside.

Methods such as laser welding, ultrasonic welding, and the like are used for such welding.

Among them, laser welding is a method where a laser beam is irradiated to a welding portion, which is melted by the energy of the laser beam, and then the melted part is solidified and joined.

On the other hand, ultrasonic welding is a method of joining by adding ultrasonic vibration while applying a load to the welding portion to generate vibrational frictional heat, and has a wide range of applications not only for metals but also for dissimilar materials including non-metals. For this ultrasonic welding, a horn and anvil are used. The horn includes a knurling portion including a plurality of protrusions protruding toward the welded object to increase friction.

However, in the past, depending on the shape of the knurling portion, there was a problem of softening of an unwanted portion of the surface of the welded object or bending of the welded object.

DISCLOSURE

Technical Problem

The present disclosure is designed to solve the problems of the related art, and therefore the present disclosure is directed to providing an ultrasonic welding device configured to solve the problem of softening of an unwanted portion of the surface of the welded object or bending of the welded object.

However, technical problems to be solved by the present disclosure are not limited to the above-described problems, and other problems not mentioned herein may be clearly understood by one of ordinary skill in the art from the following description of the present disclosure.

Technical Solution

An ultrasonic welding device according to an embodiment of the present disclosure may include a horn configured to press a first member to ultrasonically weld the first member and a second member, wherein the horn may include a knurling portion having a plurality of protrusions configured to protrude toward the first member to create a concavo-convex shape on the first member, and wherein each of the plurality of protrusions may have a length m in a direction toward the first member, the length m being greater than or equal to a thickness d of the first member.

The plurality of protrusions may be regularly provided at regular intervals n.

Each of the plurality of protrusions may be configured to have a narrower cross-sectional area in the direction toward the first member.

Each of the plurality of protrusions may be inclined to have a certain angle θ with respect to the first member.

The length m may satisfy the following Equation 1:

$$m = |\tan\theta| \times n/2 \qquad \text{Equation 1}$$

Each of the plurality of protrusions may be configured such that an end protruding toward the first member is cut by a certain length 1 along a plane parallel to the first member to form a flat surface.

Each of the plurality of protrusions may have a maximum value of the protruding length m that is greater than or equal to the thickness d of the first member.

An ultrasonic welding system according to the present disclosure may include an electrode assembly; a current collector coupled to one side of the electrode assembly; a terminal electrically coupled to the current collector; and an ultrasonic welding device that ultrasonically welds the current collector and the terminal together, wherein the ultrasonic welding device may include a plurality of protrusions configured to protrude toward the current collector, and wherein each of the plurality of protrusions may have a length protruding in a direction toward the current collector that is greater than or equal to a thickness of the current collector.

The electrode assembly may have a center hole, and wherein the current collector may include a second coupling portion coupled to the terminal at a position corresponding to the center hole.

The current collector may include a first coupling portion coupled to the electrode assembly and the second coupling portion in which at least a part thereof is thinner than a thickness of the first coupling portion.

Advantageous Effects

According to one aspect of the present disclosure, it is possible to prevent softening of the surface of the welded object or bending of the welded object. It will be described in more detail with reference to FIG. 2 again. In order to perform ultrasonic welding, a plurality of protrusions should press with a certain load while in contact with the upper member of the welded object, and ultrasonic waves should be applied at the same time. When the plurality of protrusions are smaller than the thickness of the upper member of the welded object, the upper member comes into contact even between the plurality of protrusions during the process of pressing with a certain load. Therefore, softening occurs even on an unwanted portion of the surface of the welded object to affect the welding strength, but this problem may be prevented if a plurality of protrusions are greater than or equal to the thickness of the upper member of the welded object, as in the present disclosure.

According to another aspect of the present disclosure, the arrangement of the plurality of protrusions may be changed depending on the frictional force required for ultrasonic welding. Assuming that the protruding length is greater than or equal to the thickness of the upper member of the welded object, the arrangement of the plurality of protrusions may raise the density of the plurality of protrusions in the knurling portion by making a certain angle larger and a certain interval smaller when a lot of frictional force is required, and the arrangement of the plurality of protrusions may lower the density of the plurality of protrusions in the knurling portion by making a certain angle smaller and a certain interval larger when a small frictional force is required.

According to still another aspect of the present disclosure, when welding a thin upper member, the upper member may be prevented from being torn due to a plurality of sharp protrusions. Assuming that the value obtained by subtracting a certain length from the protruding length is greater than or equal to the thickness of the upper member of the welded object, the area where the plurality of protrusions contact the upper member may be adjusted by adjusting the certain length to be cut according to the frictional force required for ultrasonic welding.

BEST MODE

Figure 1:
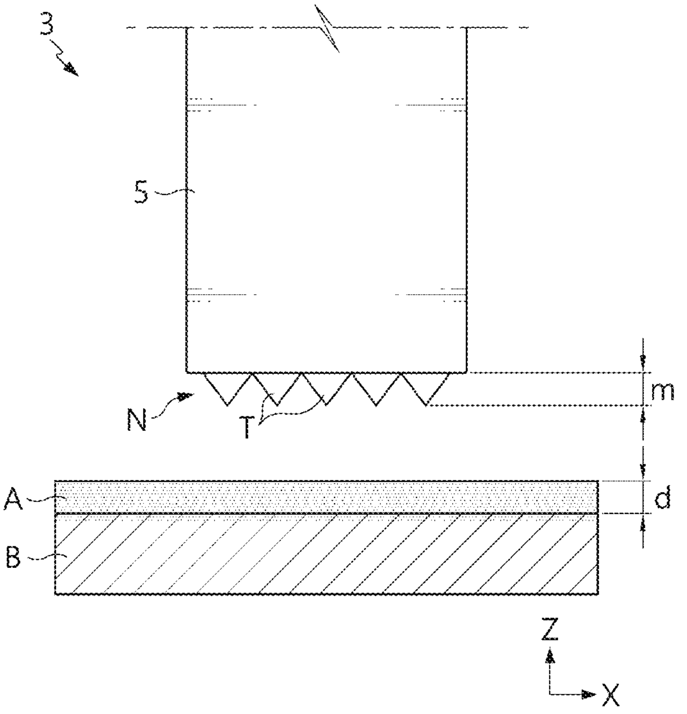
FIG. 1 is a view showing an ultrasonic welding device and a welded object according to an embodiment of the present disclosure.

Hereinafter, preferred embodiments of the present disclosure will be described in detail with reference to the accompanying drawings. Since the accompanying drawings in this specification illustrate preferred embodiments of the present disclosure, and together with the detailed description of the present disclosure described later, serve to further understand the technical aspects of the present disclosure, the present disclosure should not be construed as limited to what is shown in such drawings. The same reference numerals refer to the same components. Also, in the drawings, the thickness, ratio, and dimensions of the components may be exaggerated for effective description of the technical content.

The terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

The terms indicating directions as used herein such as upper, lower, left, right, front, and rear are used for convenience of description only, and it is obvious to those skilled in the art that the terms may vary depending on the position of a reference object or an observer.

Therefore, the embodiments described in this specification and the configurations shown in the drawings are only one of the most preferred embodiments of the present disclosure, not intended to entirely represent the technical aspects of the present disclosure, so it should be understood that various equivalents and modifications may be made thereto at the time of filing the present application.

Figure 2:
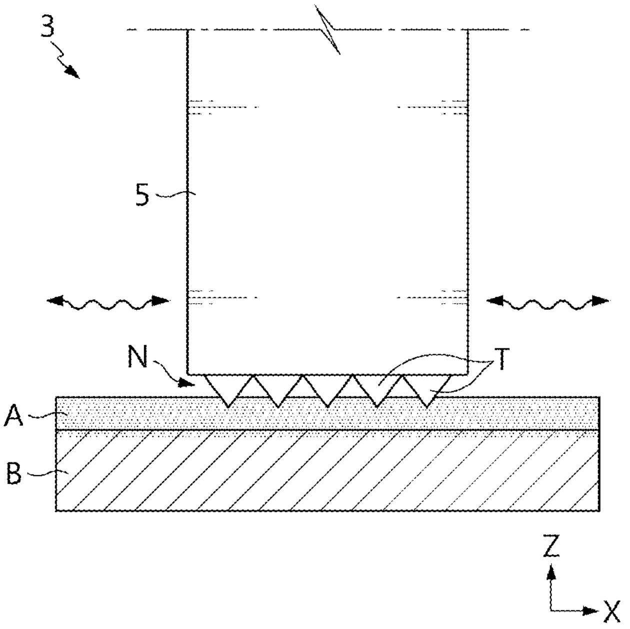
FIG. 2 is a view showing an ultrasonic welding process of an ultrasonic welding device according to an embodiment of the present disclosure.

FIG. 1 is a view showing an ultrasonic welding device 3 and a welded object A, B according to an embodiment of the present disclosure. FIG. 2 is a view showing an ultrasonic welding process of an ultrasonic welding device 3 according to an embodiment of the present disclosure.

Referring to FIGS. 1 and 2, the ultrasonic welding device 3 according to the present disclosure includes a horn 5.

The horn 5 may create a concavo-convex shape on the first member A. The horn 5 may ultrasonically weld the first member A and the second member B by pressing with a certain load while in contact with the first member A and simultaneously applying ultrasonic waves. The horn 5 may include a knurling portion N having a plurality of protrusions T configured to protrude toward the first member A. The plurality of protrusions T may ultrasonically weld the first member A and the second member B by pressing with a certain load while in contact with the first member A and simultaneously applying ultrasonic waves. However, the present disclosure is not limited to ultrasonic welding only of the first member A and the second member B. That is, the ultrasonic welding device 3 according to the present disclosure may also ultrasonically weld two or more members.

Each of the plurality of protrusions T may have a length m protruding toward the first member A greater than or equal to the thickness d of the first member A. The protruding length m may be a vertical distance from one surface of the horn 5 to the shortest protruding end along the negative direction of the Z-axis.

However, if each of the plurality of protrusions T has the same height at which it begins to be formed from one surface of the horn 5 in the Z-axis direction, and the protruding length m in the negative Z-axis direction is formed differently, the maximum value of the protruding length m of each of the plurality of protrusion T may be greater than or equal to the thickness d of the first member A.

According to this structure of the present disclosure, it is possible to prevent softening of the surface of the upper member A of the welded object or bending of the upper member A of the welded object. It will be described in more detail with reference to FIG. 2 again. In order to perform ultrasonic welding, a plurality of protrusions T should press with a certain load while in contact with the upper member A of the welded object, and ultrasonic waves should be applied at the same time. When the plurality of protrusions T are smaller than the thickness of the upper member A of the welded object, the upper member comes into contact even between the plurality of protrusions T during the process of pressing with a certain load. Therefore, softening occurs even on an unwanted portion of the surface of the upper member A of the welded object to affect the welding strength, but this problem may be prevented if the plurality of protrusions T are greater than or equal to the thickness of the upper member A of the welded object, as in the present disclosure.

Figure 3:
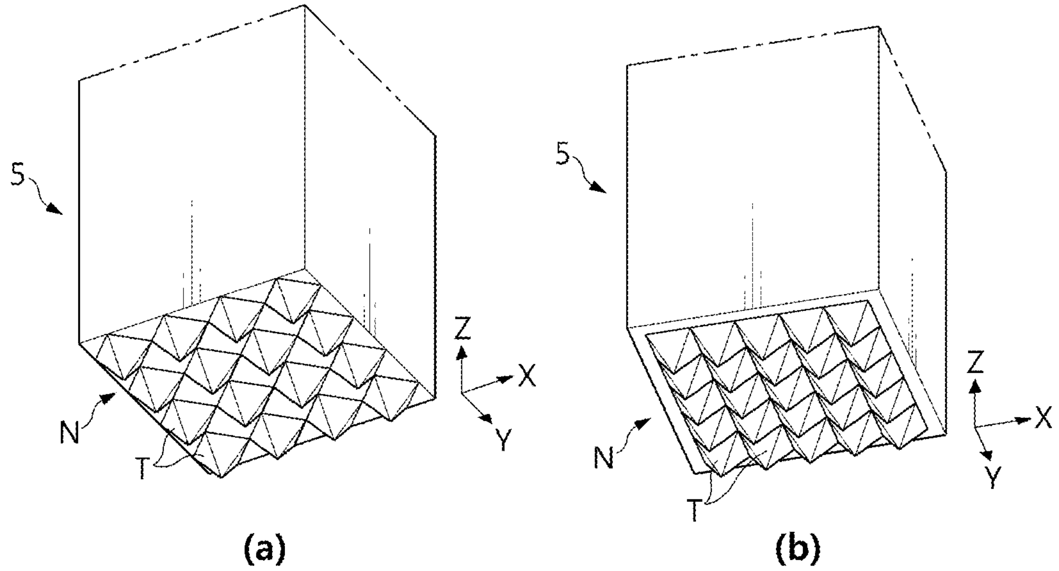
FIG. 3 is a view showing a horn included in an ultrasonic welding device according to an embodiment of the present disclosure.
Figure 4:
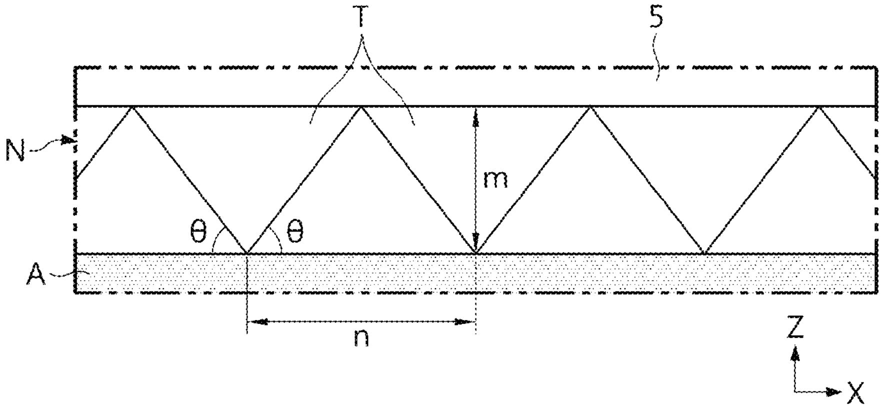
FIG. 4 is a view showing an ultrasonic welding device and a first member according to an embodiment of the present disclosure.

FIG. 3 is a view showing a horn 5 included in an ultrasonic welding device 3 according to an embodiment of the present disclosure. FIG. 4 is a view showing an ultrasonic welding device 3 and a first member A according to an embodiment of the present disclosure.

Referring to FIGS. 3 and 4, the plurality of protrusions T may be regularly provided at regular intervals n. The plurality of protrusions T may be regularly provided at regular intervals n along the X-axis and Y-axis with other adjacent protrusions T. The plurality of protrusions T may have a square shape. For example, the plurality of protrusions T may be provided to make point contact with adjacent protrusions T as shown in FIG. 3 (*a*) or may be provided to make line contact with adjacent protrusions T as shown in FIG. 3 (*b*). In this case, the regular interval n may be a distance between the shortest end portions protruding along the negative Z-axis direction of adjacent protrusions T.

Each of the plurality of protrusions T may be configured to have a narrower cross-sectional area in a direction toward the first member A (negative Z-axis direction). Each of the plurality of protrusions T may be a polygonal pyramid. For example, each of the plurality of protrusions T may be a square pyramid as shown in FIG. 3.

Each of the plurality of protrusions T may be inclined to have a certain angle θ with respect to the first member A. For example, when each of the plurality of protrusions T has a rectangular pyramid, the angle that the edge of the rectangular pyramid has with respect to the XY plane may be a certain angle θ. For example, each of the plurality of protrusions T has a rectangular pyramid as shown in FIG. 4, and the angle that the edge thereof has with respect to the XY plane may be 45 degrees.

The length of each of the plurality of protrusions T protruding toward the first member A may satisfy the following Equation 1:

$$m = |\tan\theta| \times n/2 \quad \text{Equation 1}$$

According to this structure of the present disclosure, the arrangement of the plurality of protrusions T may be changed depending on the frictional force required for ultrasonic welding. Assuming that the protruding length m is greater than or equal to the thickness of the upper member A of the welded object, the arrangement of the plurality of protrusions T may raise the density of the plurality of protrusions T in the knurling portion N by making a certain angle θ larger and a certain interval n smaller when a lot of frictional force is required, and the arrangement of the plurality of protrusions may lower the density of the plurality of protrusions T in the knurling portion N by making a certain angle θ smaller and a certain interval n larger when a small frictional force is required.

Figure 5:
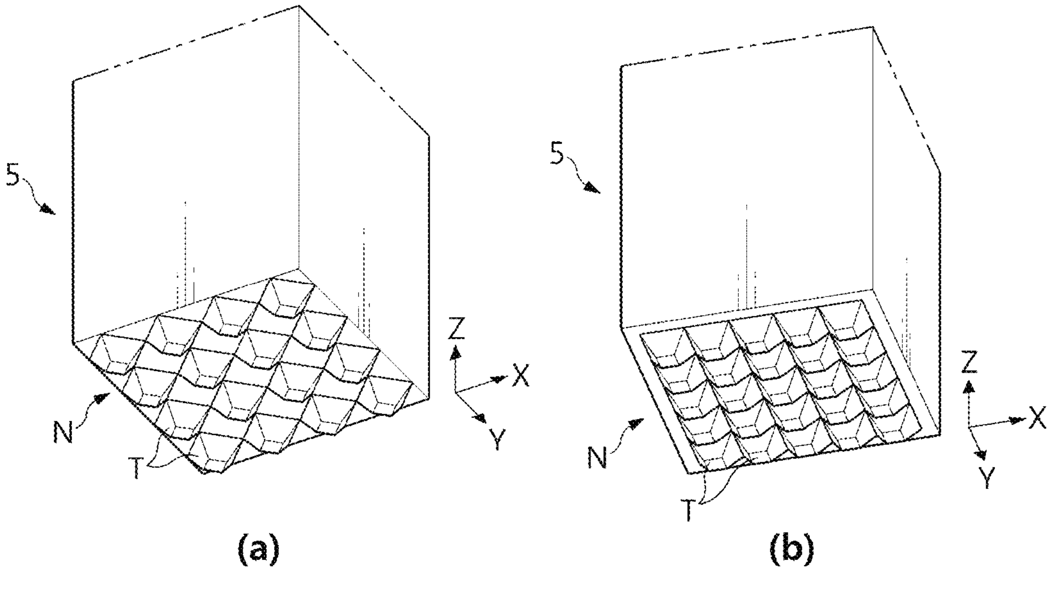
FIG. 5 is a view showing a horn included in an ultrasonic welding device according to another embodiment of the present disclosure.
Figure 6:
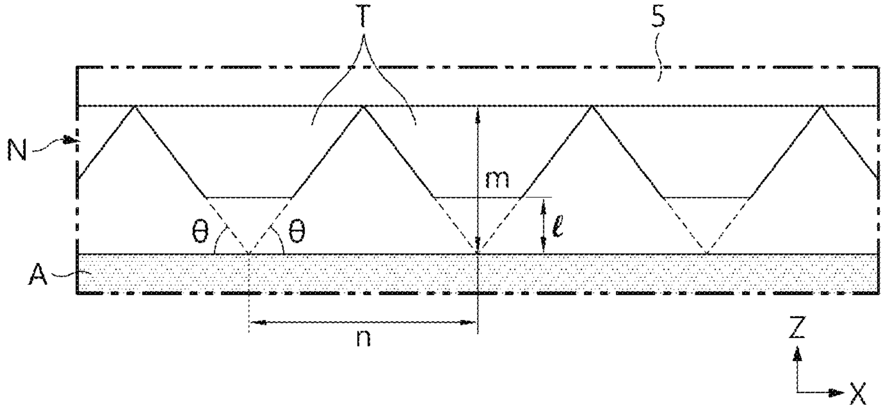
FIG. 6 is a view showing an ultrasonic welding device and a first member according to another embodiment of the present disclosure.

FIG. 5 is a view showing a horn 5 included in an ultrasonic welding device 3 according to another embodiment of the present disclosure. FIG. 6 is a view showing an ultrasonic welding device 3 and a first member A according to another embodiment of the present disclosure.

Referring to FIGS. 5 and 6, the plurality of protrusions T may be configured such that an end protruding toward the first member A is cut by a certain length 1 along a plane parallel to the first member A to form a flat surface. The certain length 1 may be a vertical distance from the flat surface formed by cutting along the negative Z-axis direction to the shortest protruding end before being cut.

Each of the plurality of protrusions T may be a polygonal pyramid formed by cutting the end of the polygonal pyramid by a certain length along a plane parallel to the XY plane. For example, each of the plurality of protrusions T may be a rectangular pyramid.

The value obtained by subtracting the certain length 1 by which ends protruding toward the first member A are cut along a plane parallel to the first member A from the length m protruding toward the first member A of each of the plurality of protrusions T may be greater than or equal to the thickness of the first member A. Even in this case, the above Equation 1 may be satisfied.

According to this structure of the present disclosure, when welding a thin upper member A, the upper member A may be prevented from being torn due to a plurality of sharp protrusions T. Assuming that the value obtained by subtracting the certain length 1 from the protruding length m is greater than or equal to the thickness of the upper member A of the welded object, the area where the plurality of protrusions T contact the upper member may be adjusted by adjusting the certain length 1 to be cut according to the frictional force required for ultrasonic welding.

Figure 7:
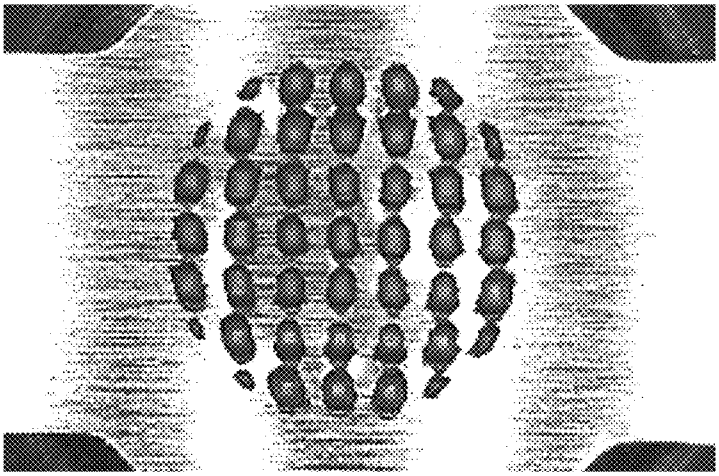
FIGS. 7 to 9 are photographs of an upper member of the welded object welded by the ultrasonic welding device according to the present disclosure.
Figure 8:
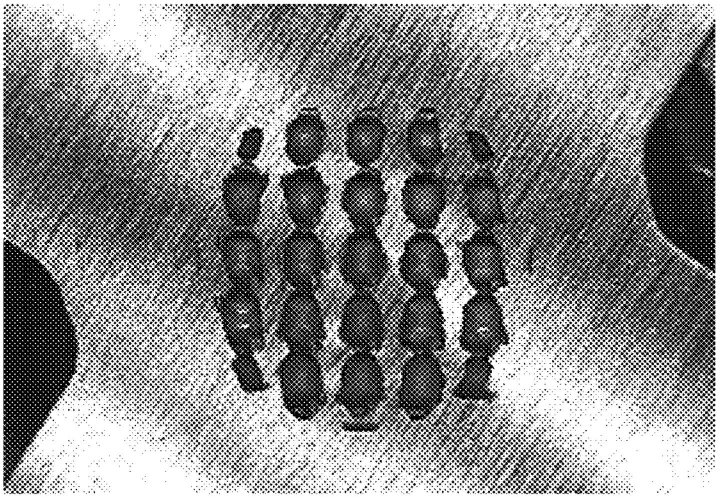
Figure 9:
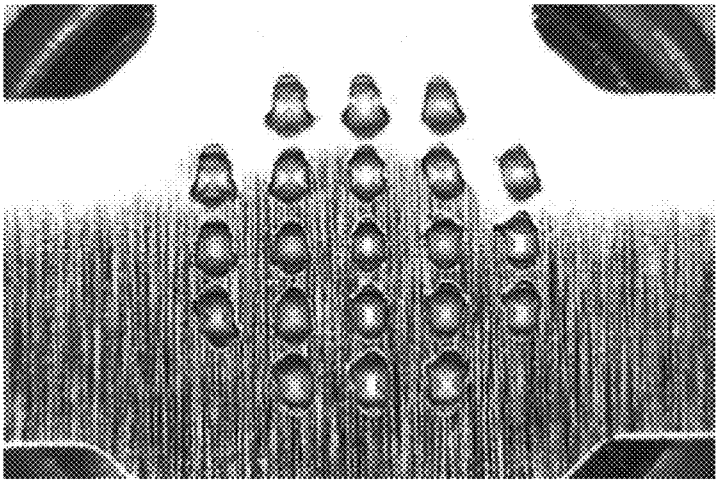

The effects of the present disclosure described above are shown in FIGS. 7 to 9. FIGS. 7 to 9 are photographs of an upper member A of the welded object welded by the ultrasonic welding device 3 according to the present disclosure.

FIG. 7 is a photograph of the ultrasonically welded upper member A when the protruding length m is 0.4 mm, the certain length 1 is 0.07 mm, and the thickness of the upper member is 0.3 mm. FIG. 8 is a photograph of the ultrasonically welded upper member A when the protruding length m is 0.6 mm, the certain length 1 is 0.07 mm, and the thickness of the upper member is 0.3 mm. FIG. 9 is a photograph of the ultrasonically welded upper member A when the protruding length m is 0.6 mm, the certain length 1 is 0.07 mm, and the thickness of the upper member is 0.3 mm.

Referring to FIGS. 7 to 9, it is not possible to find softening or bending of the peripheral portion other than the portion where the upper member contacts the plurality of protrusions T.

Figure 10:
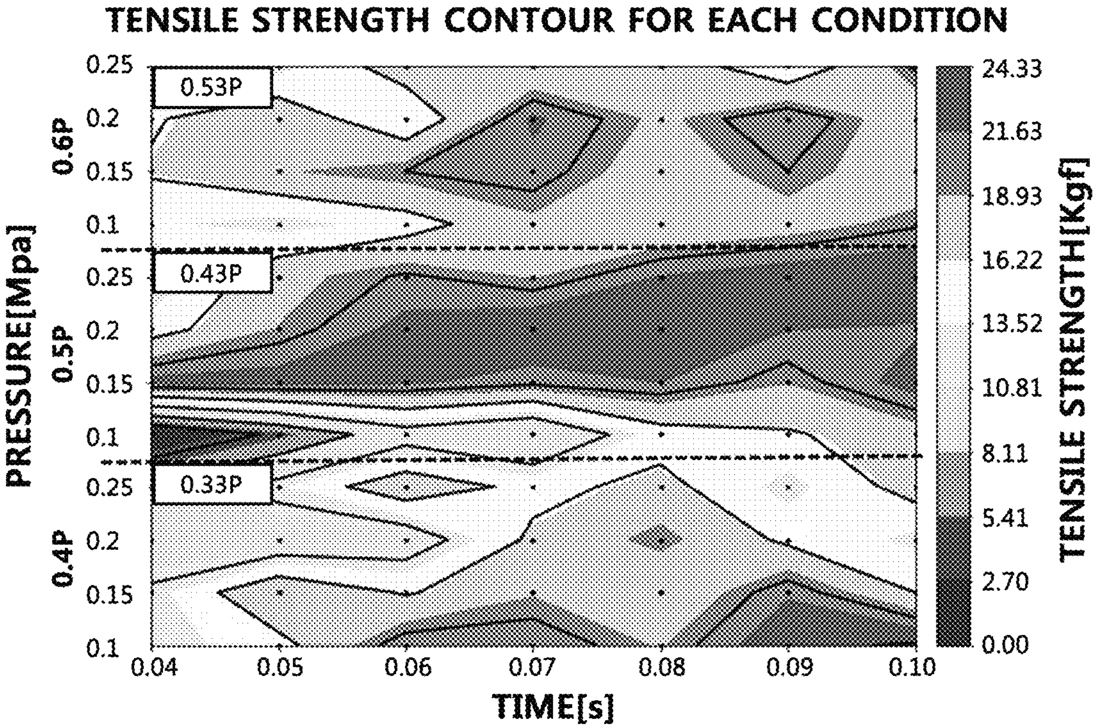
FIG. 10 is a graph showing the tensile strength of the welding portion for each condition after ultrasonic welding under certain conditions.

FIG. 10 is a graph showing the tensile strength of the welding portion for each condition after ultrasonic welding under certain conditions.

In the graph shown in FIG. 10, the X-axis represents the pressing time (unit: seconds), the Y-axis represents the pressing force (unit: Mpa), and the tensile strength of the welding portion after ultrasonic welding for each condition is plotted as a contour line.

Referring to FIG. 10, the tensile strength of the welding portion was sufficiently secured under the condition that the protruding length m was set to be larger than the thickness of the upper member, but there were cases where it was not sufficiently secured depending on the pressing force and pressing time. The criterion for securing sufficient tensile strength of the welding portion is approximately 0.5 of the tensile strength of the base material. The graph in FIG. 10 is based on 15.5 Kgf, which is approximately 0.5 of the tensile strength of 31 Kgf of the upper member.

When the protruding length m is 0.6 mm, the certain length 1 is 0.07 mm, and the thickness of the upper member is 0.3 mm, the tensile strength of the welding portion was high without being affected by the pressing force and the pressing time, except when the pressing force is 0.15 Mpa and the pressing time is 0.07 seconds or less. In the case of other conditions, it could be seen that the tensile strength of the welding portion was not sufficiently secured in a wide range of pressing force and pressing time.

A preferred embodiment of the ultrasonic welding device 3 according to the present disclosure may be a case where the protruding length m is approximately 1.33 times or more and approximately 2 times or less the thickness of the upper member A.

A preferred embodiment of the ultrasonic welding device 3 according to the present disclosure may be a case where the protruding length m is approximately 1.5 times or more and approximately 1.8 times or less the thickness of the upper member A.

A preferred embodiment of the ultrasonic welding device 3 according to the present disclosure may be a case where the certain length 1 is approximately 0.117 or more and approximately 0.175 or less of the protruding length m.

A preferred embodiment of the ultrasonic welding device 3 according to the present disclosure may be a case where the certain length 1 is approximately 0.13 or more and approximately 0.15 or less of the protruding length m.

Figure 11:
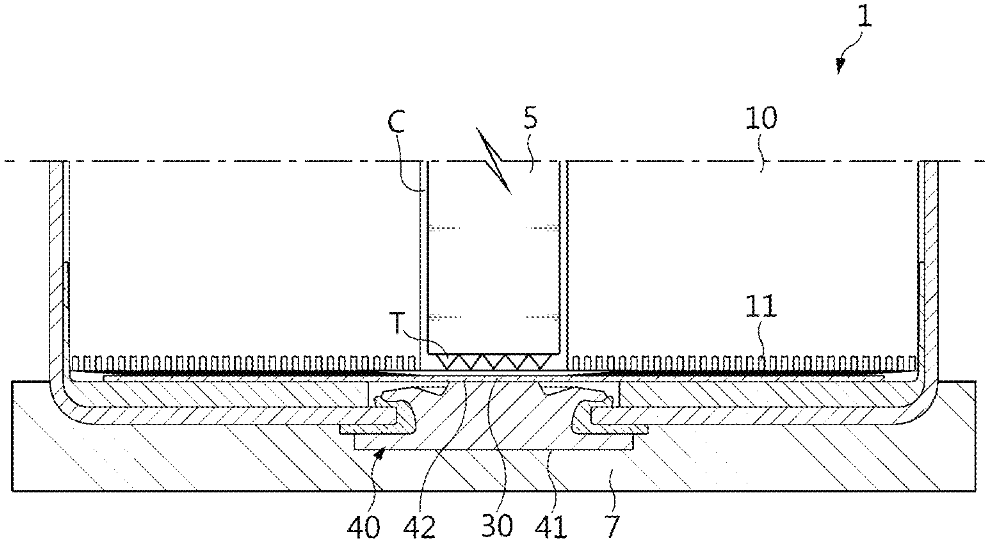
FIG. 11 is a view showing an ultrasonic welding system according to an embodiment of the present disclosure.
Figure 12:
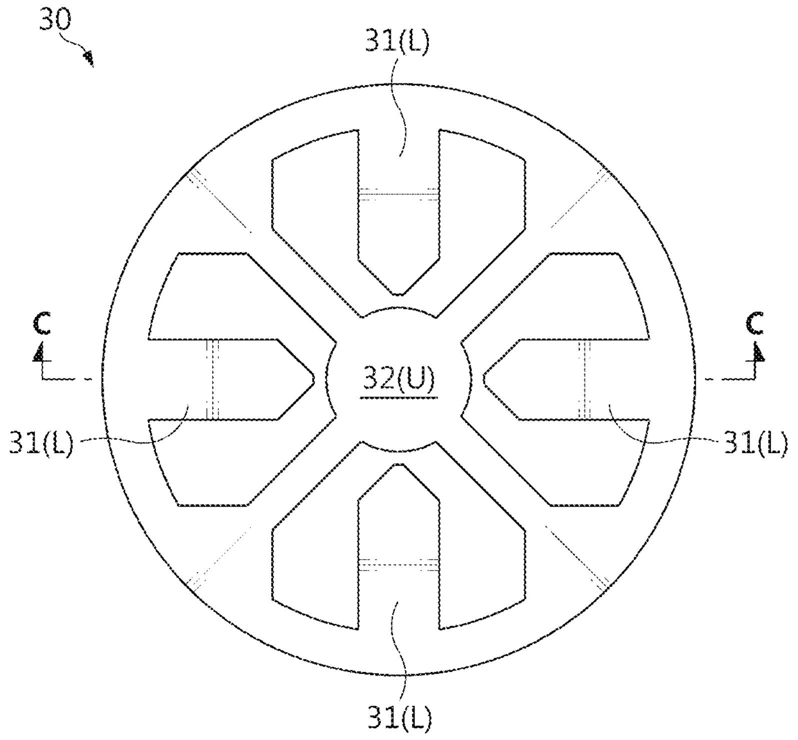
FIG. 12 is a view showing a first current collector included in an ultrasonic welding system according to an embodiment of the present disclosure.
Figure 13:
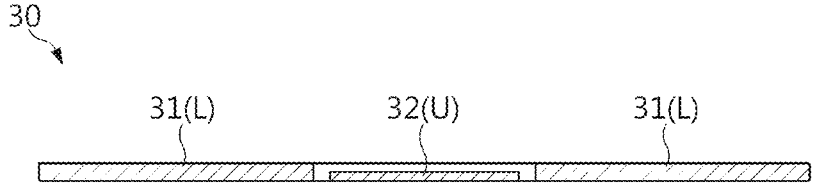
FIG. 13 is a cross-sectional view schematically showing a cross-section taken along line C-C' in FIG. 12.

FIG. 11 is a view showing an ultrasonic welding system 1 according to an embodiment of the present disclosure. FIG. 12 is a view showing a first current collector included in an ultrasonic welding system 1 according to an embodiment of the present disclosure. FIG. 13 is a cross-sectional view schematically showing a cross-section taken along line C-C' in FIG. 12.

Referring to FIGS. 11 to 13, the ultrasonic welding system 1 according to the present disclosure may include an electrode assembly 10, a current collector 30, a terminal 40, and an ultrasonic welding device 3.

The electrode assembly 10 may include a first electrode having a first polarity, a second electrode having a second polarity, and a separator interposed between the first electrode and the second electrode. The first electrode may be a negative electrode or a positive electrode, and the second electrode may correspond to an electrode having a polarity opposite to that of the first electrode. The electrode assembly 10 may be manufactured by winding a laminate formed by sequentially stacking the first electrode, the separator, the second electrode, and the separator at least once. That is, the electrode assembly 10 applied to the present disclosure may be a jelly-roll type electrode assembly 10.

This jelly-roll type electrode assembly 10 may have a center hole C formed approximately at the center thereof and extending along the height direction (a direction parallel to the Z-axis).

The first electrode may include a first electrode plate and a first electrode active material layer formed by applying a first electrode active material to at least one surface of the first electrode plate. The second electrode may include a second electrode plate and a second electrode active material layer formed by applying a second electrode active material to at least one surface of the second electrode plate. The first electrode may include a first uncoated portion 11 where no positive electrode active material or negative electrode active material is applied to the electrode plate. The second electrode may include a second uncoated portion where no positive electrode active material or negative electrode active material is applied to the electrode plate. At least a part of the first uncoated portion 11 may function as a first electrode tab, and at least a part of the second uncoated portion may function as a second electrode tab.

Meanwhile, at least a part of the first uncoated portion 11 may include a plurality of segments divided along the winding direction of the electrode assembly 10. In this case, the plurality of segments may be banded along the radial direction of the electrode assembly 10. A plurality of banded segments may be overlapped in multiple layers. In this case, the current collector 30 to be described later may be coupled to a region where the plurality of segments are overlapped in multiple layers.

The current collector 30 may be coupled to one side of the electrode assembly 10. The current collector 30 may have a first coupling portion 31 coupled to the electrode assembly 10 and a second coupling portion 32 coupled to a terminal 40 to be described later.

The first coupling portion 31 may be disposed on one surface of the electrode assembly 10. The first coupling portion 31 may be coupled to the first uncoated portion 11. The first coupling portion 31 may be coupled to the first uncoated portion 11 by laser welding. The first coupling portion 31 may have a laser welding portion L that is laser welded to the first uncoated portion 11. The first coupling portion 31 may be provided in plurality.

The second coupling portion 32 may be coupled to the terminal 40. The second coupling portion 32 may be coupled to the terminal 40 by ultrasonic welding. The second coupling portion 32 may have an ultrasonic welding portion U coupled to the terminal 40. For example, the entire second coupling portion 32 may be the ultrasonic welding portion U, and an approximately center part of the second coupling portion 32 may be the ultrasonic welding portion U.

At least a part of the second coupling portion 32 may be formed to be thinner than the thickness of the first coupling portion 31. This thickness reduction region having a relatively thin thickness may include an ultrasonic welding portion U. The thickness of the thickness reduction region may be approximately 50% or more and less than 90% of the thickness of the first coupling portion 31.

The terminal 40 includes a terminal exposure portion 41 and a terminal insertion portion 42. The terminal exposure portion 41 is exposed to the outside of the battery housing. The terminal exposure portion 41 may be located approximately at the center of the closed portion of the housing 20.

The terminal insertion portion 42 may be coupled to the second coupling portion 32 of the current collector 30. The terminal insertion portion 42 may be coupled to the current collector 30 by ultrasonic welding at a position corresponding to the center hole C of the electrode assembly 10.

It is advantageous to weld the current collector 30 and the terminal 40 by ultrasonic welding, which has the advantages of lower equipment cost compared to laser welding and low electrical resistance after welding due to less thermal deformation compared to laser welding. In addition, in the welding process, laser welding requires securing the size of the center hole C above a certain size in order to secure the laser focus, but ultrasonic welding may perform the welding process by inserting the horn 5 corresponding to the size of the center hole C.

The ultrasonic welding device 3 may ultrasonically weld the current collector 30 and the terminal 40. The ultrasonic welding device 3 may include a horn 5 that presses the current collector 30. The ultrasonic welding device 3 may include an anvil 7 that supports the terminal 40. The ultrasonic welding device 3 may include a plurality of protrusions T having each length protruding toward the current collector 30 equal to or greater than the thickness of the current collector 30. The thickness of the current collector 30 may mean a thickness of the portion where ultrasonic welding is performed in the current collector 30. That is, it may mean a thickness of the ultrasonic welding portion U of the second coupling portion 32 of the current collector 30. The horn 5 of the ultrasonic welding device 3 may be inserted into the center hole C of the electrode assembly 10 to perform welding between the current collector 30 and the terminal 40.

Ultrasonic welding is performed by generating vibrational friction heat between the upper member and the lower member due to ultrasonic vibration generated by the ultrasonic welding device 3. Therefore, if the second coupling portion 32 is excessively thick, the ultrasonic vibration generated by the ultrasonic welding device 3 may not be transmitted well, and thus welding strength may not be secured. Therefore, in order to secure welding strength during ultrasonic welding, the second coupling portion 32 should have a predetermined thickness or less.

Ultrasonic welding of the second coupling portion 32 and the terminal 40, which should be thin for ultrasonic welding efficiency, may cause the problem of softening on an unwanted portion of the surface of the second coupling portion 32 or lifting or tearing of the peripheral portion. However, this problem may be prevented by using the ultrasonic welding device 3 according to the present disclosure described above.

As described above, the present disclosure has been described mainly with preferred embodiments with reference to the accompanying drawings, but it is apparent to those skilled in the art that many and various obvious modifications are possible from this description without departing from the scope of the present disclosure. Therefore, the scope of the present disclosure should be construed by the claims which are written to include examples of such many modifications.

EXPLANATION OF REFERENCE SIGNS

1 ultrasonic welding system
3 ultrasonic welding device
5 horn
N knurling portion
T a plurality of protrusions
7 anvil
A first member
B second member
10 electrode assembly
11 first uncoated portion
C center hole
30 current collector
31 first coupling portion
L laser welding portion
32 second coupling portion
U ultrasonic welding portion
40 terminal
41 terminal exposure portion
42 terminal insertion portion

What is claimed is:

1. An ultrasonic welding device in combination with a first member and a second member, the ultrasonic welding device comprising:
- the first member and the second member; and
- a horn configured to press the first member to ultrasonically weld the first member and the second member,
- wherein the horn includes a knurling portion having a plurality of protrusions configured to protrude toward the first member to create a concavo-convex shape on the first member, and
- wherein each of the plurality of protrusions has a length m in a direction toward the first member, the length m being approximately 1.33 times or more and approximately 2 times or less of a thickness d of the first member.

2. The ultrasonic welding device according to claim 1, wherein the plurality of protrusions are regularly provided at regular intervals n.

3. The ultrasonic welding device according to claim 2, wherein each of the plurality of protrusions is configured to have a narrower cross-sectional area in the direction toward the first member.

4. The ultrasonic welding device according to claim 3, wherein each of the plurality of protrusions is inclined to have a certain angle θ with respect to the first member.

5. The ultrasonic welding device according to claim 4, wherein the length m satisfies the following Equation 1:

$$m = |\tan\theta| \times n/2 \quad \text{Equation 1}$$

6. The ultrasonic welding device according to claim 4, wherein each of the plurality of protrusions is configured so that an end protruding toward the first member is cut by a certain length 1 along a plane parallel to the first member to form a flat surface.

7. The ultrasonic welding device according to claim 1, wherein the length m is approximately 1.5 times or more and approximately 1.8 times or less of the thickness d of the first member.

8. The ultrasonic welding device according to claim 1, wherein each of the plurality of protrusions is in point contact with an adjacent protrusion.

9. The ultrasonic welding device according to claim 6, wherein the certain length 1 is approximately 0.117 or more and approximately 0.175 or less of the length m.

10. The ultrasonic welding device according to claim 9, wherein the certain length 1 is approximately 0.13 or more and approximately 0.15 or less of the length m.

* * * * *